United States Patent
Eguchi

(10) Patent No.: US 9,291,271 B2
(45) Date of Patent: Mar. 22, 2016

(54) SEAL RING

(71) Applicant: NOK CORPORATION, Tokyo (JP)

(72) Inventor: Nobuyuki Eguchi, Kitaibaraki (JP)

(73) Assignee: NOK CORPORATION, Tokyo (JP)

( * ) Notice: Subject to any disclaimer, the term of this patent is extended or adjusted under 35 U.S.C. 154(b) by 174 days.

(21) Appl. No.: 13/951,231

(22) Filed: Jul. 25, 2013

(65) Prior Publication Data

US 2013/0313781 A1 Nov. 28, 2013

Related U.S. Application Data

(62) Division of application No. 12/937,787, filed as application No. PCT/JP2009/057379 on Apr. 10, 2009, now abandoned.

(30) Foreign Application Priority Data

Apr. 15, 2008 (JP) .................. 2008-106062

(51) Int. Cl.
- *F16J 15/02* (2006.01)
- *B23P 11/02* (2006.01)
- *F16J 15/34* (2006.01)
- *F16J 15/32* (2006.01)
- *F16J 15/44* (2006.01)

(52) U.S. Cl.
CPC .......... *F16J 15/3488* (2013.01); *F16J 15/3272* (2013.01); *F16J 15/441* (2013.01); *Y10T 29/49863* (2015.01)

(58) Field of Classification Search
CPC ............ Y10T 29/49863; Y10T 29/49865; Y10T 29/4987; Y10T 29/49872; Y10T 29/83657

USPC ............ 29/446–447, 450–451, 235
See application file for complete search history.

(56) References Cited

U.S. PATENT DOCUMENTS

| | | | |
|---|---|---|---|
| 3,124,502 A * | 3/1964 | Radke | 428/66.4 |
| 5,660,398 A | 8/1997 | Terao et al. | |
| 5,713,578 A * | 2/1998 | Terao et al. | 277/582 |
| 5,882,012 A * | 3/1999 | Niwa et al. | 277/407 |
| 5,934,680 A | 8/1999 | Kakehi et al. | 277/499 |
| 6,702,299 B2 * | 3/2004 | Yamaguchi et al. | 277/628 |
| 2005/0055818 A1 * | 3/2005 | Pekarsky et al. | 29/451 |

FOREIGN PATENT DOCUMENTS

| | | |
|---|---|---|
| JP | 57-104057 A | 6/1982 |
| JP | 61-270564 A | 11/1986 |
| JP | 08-135797 A | 5/1996 |

(Continued)

OTHER PUBLICATIONS

Japanese Notification for Japanese Patent Application No. 2008-106062, dated Jan. 31, 2012, and English translation thereof.

*Primary Examiner* — Vishal Patel
(74) *Attorney, Agent, or Firm* — Harness, Dickey & Pierce, P.L.C.

(57) ABSTRACT

Sandwiching of a foreign matter between a seal ring and a housing is suppressed, and abrasion of the housing and the seal ring is suppressed. The size of the diameter of a second seal portion 3 is set to be larger than the size d2 of the diameter of an inner peripheral face 81 so that the difference in diameter size between the second seal portion 3 and an inner peripheral face 81 of a housing 80 becomes 1.0 mm or less in a state before the ring body is provided in the annular gap.

1 Claim, 5 Drawing Sheets

(56) References Cited

FOREIGN PATENT DOCUMENTS

| | | |
|---|---|---|
| JP | 10002424 A | 1/1998 |
| JP | 10019128 A | 1/1998 |
| JP | 3362099 A | 8/1998 |
| JP | 2001-165313 A | 6/2001 |
| JP | 2002-372153 A | 12/2002 |
| JP | 2002372153 A * | 12/2002 |
| JP | 2006-038063 A | 2/2006 |
| JP | 2006-083779 A | 3/2006 |
| JP | 2006112548 A * | 4/2006 |

* cited by examiner

Fig. 4(A)
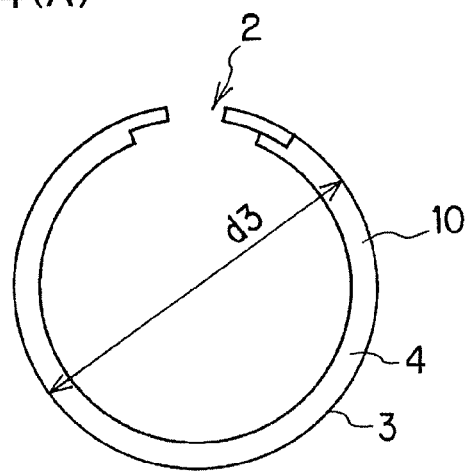
Fig. 4(B)
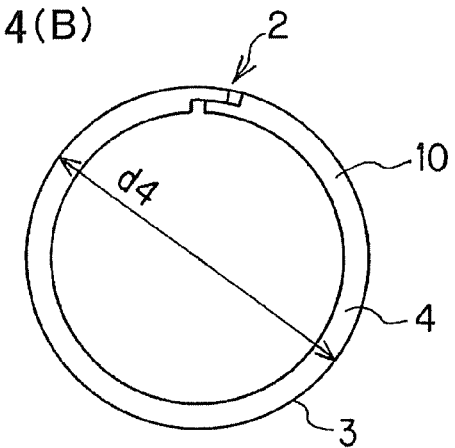

SEAL RING

CROSS-REFERENCE TO RELATED APPLICATIONS

This application is a divisional of U.S. patent application Ser. No. 12/937787, filed on Oct. 14, 2010, which is a National Stage of International Application No. PCT/JP2009/057379, filed Apr. 10, 2009, which claims the benefit and priority of Japanese Application No. 2008-106062, filed Apr. 14, 2008, the entire disclosures of which are incorporated herein by reference.

FIELD

The present invention relates to a seal ring for sealing an annular gap between two members which are provided movable relative to each other.

BACKGROUND

In recent years, there is a need to reduce a leak amount in a seal ring used for various hydraulic devices (particularly, an automatic transmission for a car) for the purpose of improvement in controllability and performance of the devices.

As a measure to reduce a leak amount, a demand for a seal ring made of a resin such as PEEK or PPS manufactured by injection molding, in which the shape of a cut provided in a place in the circumference of the seal ring is set as a special step cut is increasing.

On the other hand, in the interest of reduction in weight of a device on the other side, miniaturization, and VA (value analysis), use of a material which is not desirable as a sliding member such as aluminum or rolled soft steel is increasing. In the case of using such a material for a sliding member in a seal ring, it is concerned that the seal ring slides in a state where a foreign matter enters an outer peripheral face of the seal ring, and metal on the other side wears.

Literature disclosing conventional techniques related to the present invention are, for example, Patent Literature 1 and 2.

CITATION LIST

Patent Literature

Patent Literature 1: Japanese Patent Application Laid-Open No. 61-270564
Patent Literature 2: Japanese Patent No. 3,362,099

SUMMARY

Technical Problem

The present invention has been achieved in view of the above-described circumstances and an object of the invention is to provide a technique capable of suppressing sandwiching of a foreign matter between a seal ring and a housing and suppressing abrasion of the housing and the seal ring.

Solution to Problem

To achieve the object, the present invention employs the following configuration.

A factor of invasion of a foreign matter to an outer peripheral face of a seal ring will now be considered.

In the case where the diameter of a seal ring attached in a groove is smaller than that of a housing on the other side, in a state where an action pressure is zero or very low, a gap occurs between the housing on the other side and the outer peripheral face of the seal ring, and a foreign matter in atmosphere (in a fluid to be sealed) intervenes. After that, when pressure P acts, the seal ring expands in the housing, and the foreign matter is stuck in the gap. When a shaft or the housing rotates, the seal ring relative to the housing slides in the state where the foreign matter is stuck. Depending on the hardness and amount of the foreign matter, wear of the housing and the seal ring is promoted.

Therefore, in the present invention, the outside diameter of the seal ring at the time of manufacture is set to be larger than the inside diameter of the housing.

A seal ring includes a first seal portion which is attached in an annular groove provided in a shaft member to be assembled in a shaft hole in a housing and which comes into close contact with a sidewall face on a side of a fluid which is not to be sealed of the annular groove, and a second seal portion which comes into close contact with an inner peripheral face of the housing, the seal ring for sealing an annular gap between the shaft member and the housing, having a separation portion provided in one place in the circumferential direction of the ring body, the separation portion provided with, at one separation end, a circular projection which projects in the circumferential direction and, at the other separation end, a circular recess which engages with the circular projection, the circular projection and the circular recess being provided with mating faces which enable relative movement in the circumferential direction, and capable of absorbing a change in circumferential length of the ring body by the relative movement in the circumferential direction between the circular projection and the circular recess, wherein the size of the diameter of the second seal portion is set to be larger than the size of the diameter of the inner peripheral face so that the difference in the size of the diameter between the second seal portion and the inner peripheral face of the housing becomes 1.0 mm or less in a state before the ring body is provided in the annular gap.

A seal ring includes a first seal portion which is attached in an annular groove provided in a shaft member to be assembled in a shaft hole in a housing and which comes into close contact with a sidewall face on a side of a fluid which is not to be sealed of the annular groove, and a second seal portion which comes into close contact with an inner peripheral face of the housing, the seal ring for sealing an annular gap between the shaft member and the housing, having a separation portion provided in one place in the circumferential direction of the ring body, the separation portion provided with, at one separation end, a circular projection which projects in the circumferential direction and, at the other separation end, a circular recess which engages with the circular projection, the circular projection and the circular recess being provided with mating faces which enable relative movement in the circumferential direction, and capable of absorbing a change in circumferential length of the ring body by the relative movement in the circumferential direction between the circular projection and the circular recess, wherein the size of the diameter of the second seal portion is set to be larger than the size of the diameter of the inner peripheral face of the housing by 5 to 10% in a state before the ring body is provided in the annular gap, after that, adjusted to be smaller than the size of the diameter of the inner peripheral face by 1.0 mm or less by a shaping process and, after that, the ring body is attached in the annular groove and provided in the annular gap, expanded by execution of a pre-conditioning interim operation or being heated, and comes into close contact with the inner peripheral face.

With such a configuration, occurrence of a gap between the seal ring and the housing can be suppressed, so that invasion of a foreign matter to the gap can be suppressed. Thus, the seal performance can be improved, and the longer life can be achieved.

Leakage time in the beginning of pressurization, that is, time until the outer diameter of the seal ring expands to the inner diameter of the housing and a sealing function is displayed, so-called response can be shortened (to zero). Thus, precision of control on a fluid to be sealed can be improved.

Advantageous Effects of Invention

According to the present invention, a technique capable of suppressing sandwiching of a foreign matter between a seal ring and a housing and suppressing abrasion of the housing and the seal ring can be provided.

DRAWINGS

FIG. 4(A) is a plan view of a seal ring 10 according to a second embodiment of the invention and is a diagram showing the seal ring 10 at the time of molding (at the time of manufacture), and FIG. 4(B) is a plan view of the seal ring 10 according to the second embodiment of the invention and is a diagram showing the seal ring 10 subjected to an additional process (shaping process) after molding.

Figure 5:
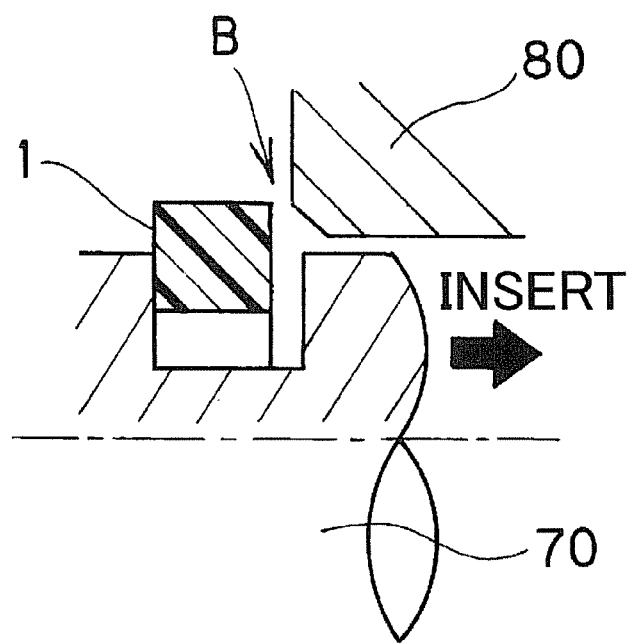

FIG. 5 is a diagram for explaining the time when the seal ling 1 is mounted.

DETAILED DESCRIPTION

Best modes for carrying out the present invention will be illustratively described in detail below with reference to the accompanying drawings. The dimensions, materials, shapes and relative arrangements of components described in the embodiments are to be properly changed according to the configuration of a device to which the invention is applied and various conditions, and the scope of the invention is not intended to be limited to the following embodiments.

(First Embodiment)

Figure 1:
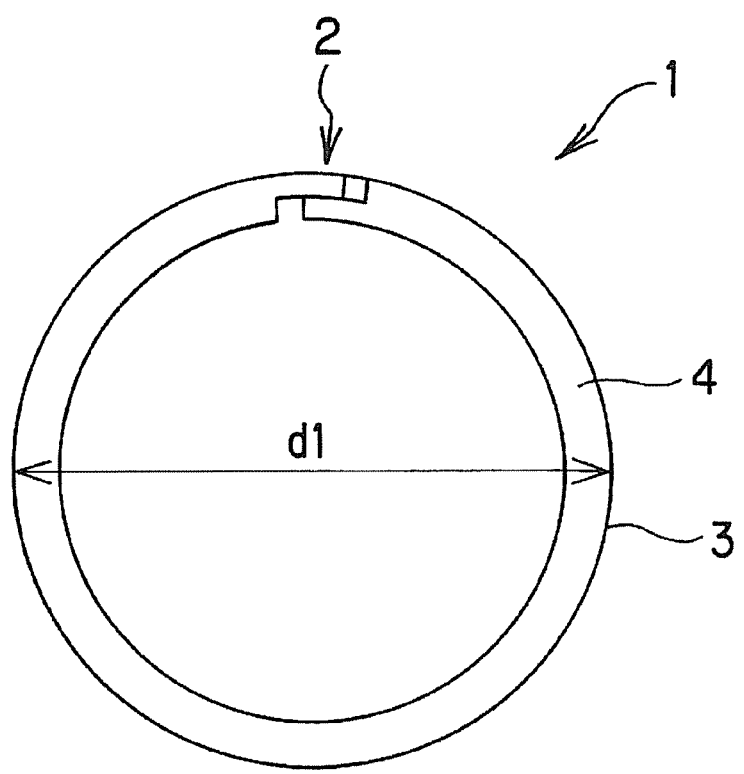
FIG. 1 is a plan view of a seal ring according to a first embodiment of the invention.
Figure 2:
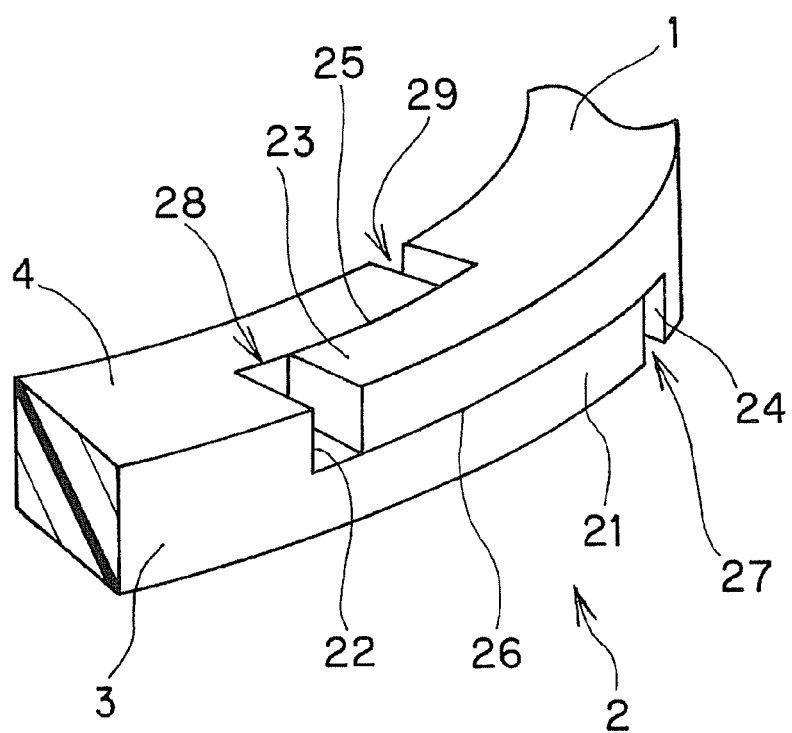
FIG. 2 is a partially-broken perspective view showing a main part of the seal ring 1 according to the first embodiment of the invention.
Figure 3:
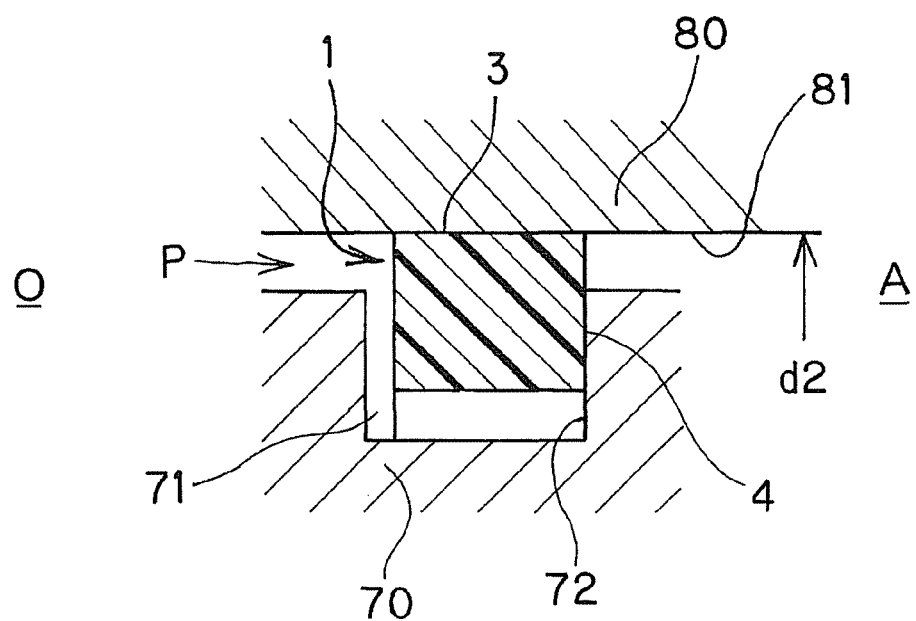
FIG. 3 is a schematic section showing the seal ring 1 according to the first embodiment of the invention.

With reference to FIGS. 1 to 3, a seal ring 1 according to a first embodiment of the present invention will be described. FIG. 1 is a plan view of the seal ring according to the embodiment. FIG. 2 is a partially-broken perspective view showing a main part of the seal ring 1 according to the embodiment. FIG. 3 is a schematic section showing the seal ring 1 according to the embodiment.

The seal ring 1 is provided to seal (hermetically close) an annular gap between a housing 80 as another member provided with a shaft hole and a shaft 70 as one member inserted in the shaft hole, and is used by being attached in an annular groove 71 provided for the shaft 70.

The seal ring 1 is made of a resin material and has a first seal portion 4 for sealing a sidewall face 72 on a side A of a fluid which is not to be sealed in the annular groove 71 and a second seal portion 3 for sealing an inner peripheral face 81 of the shaft hole provided for the housing 80.

When a pressure is applied in the direction of an arrow P in FIG. 3 from the side O of a fluid to be sealed to the side A of a fluid which is not to be sealed, the seal ring 1 is pushed to the side A of the fluid which is not to be sealed. Therefore, the first seal portion 4 pushes the sidewall face 72 of the annular groove 71, the second seal portion 3 pushes the inner peripheral face 81 of a shaft hole facing the annular groove 71, and they perform sealing at the respective positions.

In such a manner, leakage of the fluid to be sealed to the side A of the fluid which is not to be sealed is prevented.

The fluid to be sealed is, for example, lubricating oil and, particularly, in the case where it is used for a transmission of a car, it refers to an ATF (Automatic Transmission Fluid).

As shown in the diagram, the ring body of the seal ring 1 is provided with a separation portion 2 in a place in the circumferential direction for the purpose of improvement in assembly and the like.

Various forms of such a separation portion 2 are known. In the embodiment, as a separation portion which can reduce a leakage amount and suitably handle a change in ambient temperature, as shown in the diagram, a special step cut which has two steps is adopted. Specifically, as shown in the diagram, a stepped separation portion is formed in each of the first seal portion 4 side and the second seal portion 3 side.

The special step cut has a set of a (circular) projection 21 and a (circular) recess 22 in a lateral direction (axial direction) on one of outer peripheral sides and has a set of a (circular) recess 24 and a (circular) projection 23 in the lateral direction on the other side via the separation portion. The projection 21 and the recess 24 fit each other, and the recess 22 and the projection 23 fit each other.

The special step cut has a configuration to separate between the side O of the fluid to be sealed and the side A of the fluid which is not to be sealed while having clearances in the circumferential direction of faces perpendicular to each other in the circumferential direction (in FIG. 2, a clearance 27 formed between a front end face of the projection 21 and an opposed face of the recess 24 facing the front end face, a clearance 28 formed between a front end face of the projection 23 and the opposed face of the recess 22 facing the front end face, and a clearance 29 on the inner circumferential side).

In other words, the projection 23 and the recess 22 come into sliding contact with a separating face 25 concentric with the second seal portion 3 and also a separating face 26 perpendicular to the axis. With the configuration, even there are the clearances 27, 28, and 29 as described above, there is no interrupted portion in the seal face in any of the second and first seal portions 3 and 4 by the separation portion 2.

Therefore, even if the ring body expands due to heat and the intervals of the clearances 27, 28 and 29 fluctuate, an amount of the changes in dimensions can be absorbed only by the clearances while maintaining the sealed state. Consequently, the sealing performance can be maintained also against changes in the ambient temperature.

Next, a characteristic configuration of the embodiment will be described.

In the embodiment, an outer diameter d1 of the seal ring 1 is set to be larger than an inner diameter d2 of the housing 80 in a natural state before attachment to the annular groove 71 (no external force is applied).

More concretely, the relation between the outer diameter d1 of the seal ring 1 and the inner diameter d2 of the housing 80 is set to satisfy $0 \text{ mm} < (d1-d2) \leq 1 \text{ mm}$, preferably, $0.2 \text{ mm} (d1-d2) \leq 0.4 \text{ mm}$.

By constructing the seal ring 1 in such a manner, in the case where the seal ring 1 is attached in the annular groove 71 and is disposed in the annular gap between the housing 80 and the shaft 70, the seal ring 1 is always in close contact with the inner circumferential face of the housing 80, and invasion of a foreign matter to the outer peripheral face of the seal ring 1 caused by occurrence of the gap between the outer peripheral face of the seal ring 1 and the inner peripheral face of the housing 80 can be suppressed. Thus, the seal performance can be improved, and the longer life can be achieved.

Leakage time in the beginning of pressurization, that is, time until the outer diameter of the seal ring 1 expands to the inner diameter of the housing 80 and a sealing function is displayed, so-called response can be shortened (to zero). Thus, precision of control on a fluid to be sealed can be improved.

In the embodiment, a special step cut is used as the separation portion 2 in the seal ring 1.

In the case where the separation portion in the seal ring is, for example, a straight cut, if equipment operates and the temperature of the seal ring rises, it is concerned that separation portions butt each other due to a change with time caused by heat and a permanent distortion (plastic-deformable state) occurs due to generation of a compression force in the circumferential direction around the separation portion. When a permanent distortion occurs and the circumference length of the seal ring is shortened in a room-temperature or a low-temperature region, there is a possibility that a leak amount increases.

In the seal ring 1 in the embodiment, the separation portion 2 is used as a special step cut. An amount of a change in dimension can be absorbed only by the amount of the clearances 27, 28, and 29 in the separation portion 2. Thus, the sealing performance can be maintained even a change occurs in the ambient temperature.

(Second Embodiment)

FIG. 4(A) is a plan view of a seal ring 10 according to a second embodiment of the invention and is a diagram showing the seal ring 10 at the time of molding (at the time of manufacture), and FIG. 4(B) is a view of the seal ring 10 and is a diagram showing the seal ring 10 subjected to an additional process (shaping process) after molding. FIG. 5 is a diagram for explaining attachment of the seal ring. The basic configuration of the seal ring 10 in the embodiment is similar to that of the seal ring 1 described in the first embodiment.

The same reference numerals are denoted to likewise components and their description will not be repeated.

In the first embodiment, the outer diameter of the seal ring 1 is set to be larger than the inner diameter of the housing 80. However, at the time of attaching the seal ring, depending on the structure of equipment to which the seal ring is applied, it is concerned that the outer periphery of the seal ring 1 interferes the housing 80 (portion B in FIG. 5), and it becomes difficult to assemble the shaft 70 in which the seal ring 1 is attached to the annular groove 71 to the shaft hole in the housing 80 as shown in FIG. 5.

In the second embodiment, therefore, the seal ring 10 is molded in such a manner that the outer diameter of the seal ring 10 is larger than the inner diameter of the housing 80 like the seal ring 1 of the first embodiment (refer to FIG. 4(A)). After that, adjustment is made by an additional process (shaping process) so that the outer diameter of the seal ring 10 becomes smaller than the inner diameter of the housing 80 (refer to FIG. 4(B)). The shaft 70 in which the seal ring 10 is attached in the annular groove 71 is assembled in the shaft hole in the housing 80. After that, by performing pre-conditioning interim operation or applying heat to the equipment, the outer diameter of the seal ring 10 is expanded, and the annular gap between the seal ring 10 and the inner circumferential face of the housing 80 is sealed.

A method for manufacturing the seal ring 10 according to the embodiment will be described below.

First, the seal ring 10 is molded so that an outer diameter d3 of the ring body is larger than an inner diameter d2 of the housing by 5 to 10%. Preferably, the seal ring 10 is molded by, for example, injection molding. At the time of molding, the separation portion 2 is also formed in the seal ring 10.

Next, a shaping process is performed on the molded seal ring 10.

An example of the shaping process on the seal ring 10 will be described. First, the seal ring 10 is loaded and restrained in a hot forming die. The hot forming die has a groove on the inner diameter side of an annular heating ring, in which the seal ring 10 is to be fit. The hot forming die has, on the outer diameter side, a heater for heating the heating ring itself.

The seal ring 10 is restrained in the groove in the hot forming die and heated by the heater, thereby performing the shaping process to substantially reduce the outside diameter of the seal ring 10. By the shaping process, the outside diameter d4 of the seal ring 10 is adjusted to be smaller than the inner diameter of the housing 80 by 0 to 1.0 mm, preferably, 0.2 to 0.4 mm.

In the case of assembling the shaft 70 in which the seal ring 10 manufactured as described above is attached in the annular groove 71 to the shaft hole in the housing 80, since the outside diameter of the seal ring 10 is adjusted to be smaller than the inner diameter d2 of the housing 80, the seal ring 10 does not interfere with the housing 80, and the assembly work can be performed excellently.

After the seal ring 10 is assembled in the housing 80, by execution of pre-conditioning interim operation (or the equipment may be operated a few times) or by application of heat to the equipment, the seal ring 10 expands. Consequently, the seal ring 10 comes into close contact with the inner circumferential face of the housing 80.

Therefore, invasion of a foreign matter to the outer peripheral face of the seal ring 10 due to occurrence of a gap between the outer peripheral face of the seal ring 10 and the inner peripheral face of the housing 80 can be suppressed. It can improve the sealing performance and extend the life.

Leakage time in the beginning of pressurization, that is, time until the outer diameter of the seal ring 10 expands to the diameter of the housing and a sealing function is displayed, so-called response can be shortened (to zero). Thus, precision of control on a fluid to be sealed can be improved.

REFERENCE SIGNS LIST 1,10 seal ring
2 separation portion
21 projection
22 recess
23 projection
24 recess
25,26 separating face
27,28,29 clearance
3 second seal portion
4 first seal portion
70 shaft
71 annular groove
72 sidewall face
80 housing
81 inner peripheral face

What is claimed is:

1. A method for setting a seal ring, the seal ring being attached to an annual groove provided in a shaft member to be assembled in a shaft hole in a housing, the seal ring including a first seal portion which comes into close contact with a sidewall face on a side of a fluid which is not to be sealed of the annular groove, and a second seal portion which comes into close contact with an inner peripheral face of the housing, the seal ring for sealing an annular gap between the shaft member and the housing, the seal ring having a separation portion provided in one place in the circumferential direction of a ring body of the seal ring, the separation portion provided with, at one separation end, a circular projection which projects in the circumferential direction and, at the other separation end, a circular recess which engages with the circular projection, the circular projection and the circular recess being provided with mating faces which enable relative movement in the circumferential direction, and the seal ring being capable of absorbing a change in circumferential length of the ring body by the relative movement in the circumferential direction between the circular projection and the circular recess, the method comprising:

forming the ring body by injection molding molten plastic in a cavity such that, in a state after the molten plastic is cooled and before the ring body is provided in the annular gap, a diameter of the second seal portion is larger than a diameter of the inner peripheral face of the housing by 5 to 10%;

after forming the ring body, adjusting the diameter of the molded ring body to be smaller than the diameter of the inner peripheral face by 1.0 mm or less by heating the ring body in a hot die and performing a shaping process; and after adjusting the ring body, installing the ring body in the annular groove within the shaft and within the shaft hole and expanding the ring body by executing a pre-conditioning interim heating, and making the ring body expand and come into close contact with the inner peripheral face.

* * * * *